United States Patent
Angilletta

[11] 3,960,135
[45] June 1, 1976

[54] SOLAR HEATER AND THERMAL BARRIER

[76] Inventor: Domenick J. Angilletta, 223 E. Knight Ave., Collingswood, N.J. 08108

[22] Filed: Nov. 26, 1974

[21] Appl. No.: 527,486

[52] U.S. Cl. .............................. 126/270; 237/1 A
[51] Int. Cl.² ......................................... F24J 3/02
[58] Field of Search ............ 126/270, 271; 237/1 A; 165/47, 48

[56] References Cited
UNITED STATES PATENTS

| | | | |
|---|---|---|---|
| 246,626 | 9/1881 | Morse | 126/270 |
| 2,931,578 | 4/1960 | Thompson | 126/270 |
| 3,832,992 | 9/1974 | Trombe et al. | 126/270 |
| 3,863,621 | 2/1975 | Schoenfelder | 126/270 |

Primary Examiner—Kenneth W. Sprague
Assistant Examiner—James C. Yeung
Attorney, Agent, or Firm—Morton C. Jacobs

[57] ABSTRACT

A distribution of solar heat into the ambient air of an enclosed space and a reduction of thermal energy loss from said ambient air and from said enclosed space is provided by means of a box attached to the inner side of a conventional window sash. A vertically-oriented, highly heat absorptive surface within the box has its temperature increased as solar radiation generally in the form of direct sunlight passes through the glass of the window sash, enters the front of the attached box and impinges on the energy absorbing surface. Ambient air from the enclosed space moving by natural convective action enters the box through side and bottom openings in said box, passes over the heated surface in heat exchange relationship thereto, is warmed, leaves the box at or near the top and re-enters the enclosed space at an elevated temperature.

7 Claims, 4 Drawing Figures

SOLAR HEATER AND THERMAL BARRIER

BACKGROUND OF THE INVENTION

This invention relates to a thermal energy utilization and conservation apparatus for use on a conventional window sash where such window sash is oriented to receive solar radiation directly or indirectly by reflection.

Fuel economy in heating enclosed spaces, energy conservation and reduction in heating system installation costs are more desirable today than ever before when considered in relation to fuel shortages, high fuel costs and national policy. Prior to construction, buildings can be designed and located at a site to advantageously use topography, sun position, prevailing winds, adjacent buildings, natural shading, material color and texture, etc., in order to reduce heating requirements. Economics and availability of fuel supplies can be factored into selection of the thermal control system.

However, for the majority of heated structures, whether residential, commercial or industrial, which are already constructed and in use, significant reduction in consumption of thermal energy is only accomplished by reduction in usage of the facility or its heat generating equipment or by relatively significant and costly modification to the structure to reduce heating requirements.

Thus, desirable features in the construction of an apparatus to supplement heating and to reduce heat losses from an existing system are simplicity, ease of installation and maintenance, low initial cost, minimal alteration of existing structure or its usage, and minimal, if any, power consumption in operation.

SUMMARY OF THE INVENTION

Accordingly, it is among the objects of this invention to provide a new and improved apparatus to utilize radiant solar energy to heat an enclosed space and to conserve thermal energy within a heated enclosure such as a room in a residence. Other objects are to provide a solar heating and energy conservation apparatus which has one or more of the following features: economical cost, little, if any, operating expense, simple installation and maintenance and when installed, minimal alteration of existing structure.

In one embodiment of this invention, an improved solar energy heater and energy conservation apparatus comprises a rectangular boxlike assemblage relatively shallow in depth which is applied and removably fixed to the sash of windows which have an orientation to receive direct solar radiation. Said assemblage is attached to the lower interior side of a window sash, (or the lower sash of a double-hung window) thus the building or structure's external configuration is unaltered by installation of said boxlike assemblage and the window sash with attached box may continue as before to be raised or lowered without any change in this procedure.

The box front of the heating unit consists of a pane of transparent untinted glass standing approximately parallel to the glass of the window sash and separated therefrom by an air space. Said air space is sealed by a flexible gasket lying on the periphery of the box front glass surface and pressing upon the window sash when the box is attached to the sash. The resultant double pane window acts as an insulator to retard outflow of heat through the window at night and at other times when the sun's energy is absent from the window, but solar radiation readily enters through the glass with relatively little heat absorption in the glass itself.

Two solar energy absorbing surfaces are oriented within the box in a plane substantially parallel to but set back from the above-mentioned glass panes. Height and width of said energy absorbing surfaces taken together approximately equal corresponding dimensions of the front glass pane in the box. The energy absorbing surfaces are attached to back panels of the box which panels are made of a rigid material having low thermal conductivity. Said back panels, hinge-mounted to the box frame at the sides, comprise the back closure of the box.

The box frame consists of side, top and bottom panels, some or all of which have a plurality of slots therethrough to permit a free flow of air. These elements are relatively narrow so that the depth of the box assembly is shallow and does not project very far into the room in which they are used.

In operation with the box assembly attached to the window sash, the sun's rays pass through the double glass panes and impinge on the thermally absorptive surfaces within resulting in a substantial elevation in surface temperature. By means of heat exchange and air convection, the air in the room is effectively heated.

BRIEF DESCRIPTION OF THE DRAWINGS

The foregoing and other objects of this invention, the various features thereof, as well as the invention itself, will be more fully understood from the following description, when read together with the accompanying drawing in which.

In the drawing corresponding parts are referenced throughout by similar numerals.

DESCRIPTION OF A PREFERRED EMBODIMENT

Figure 3:
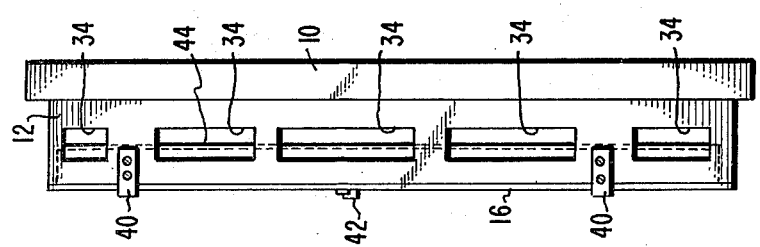
FIG. 3 is a side view of the heater unit of FIG. 1.
Figure 4:
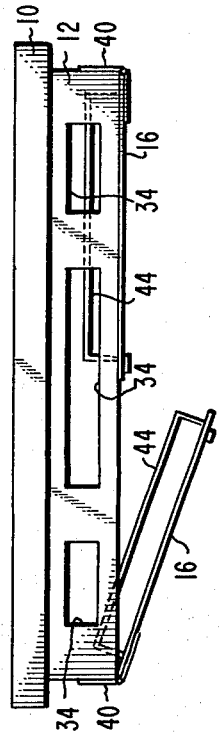
FIG. 4 is a top view of the heater unit of FIG. 1 showing the left panel, with heating surface attached, in a partially opened position.
Figure 2:
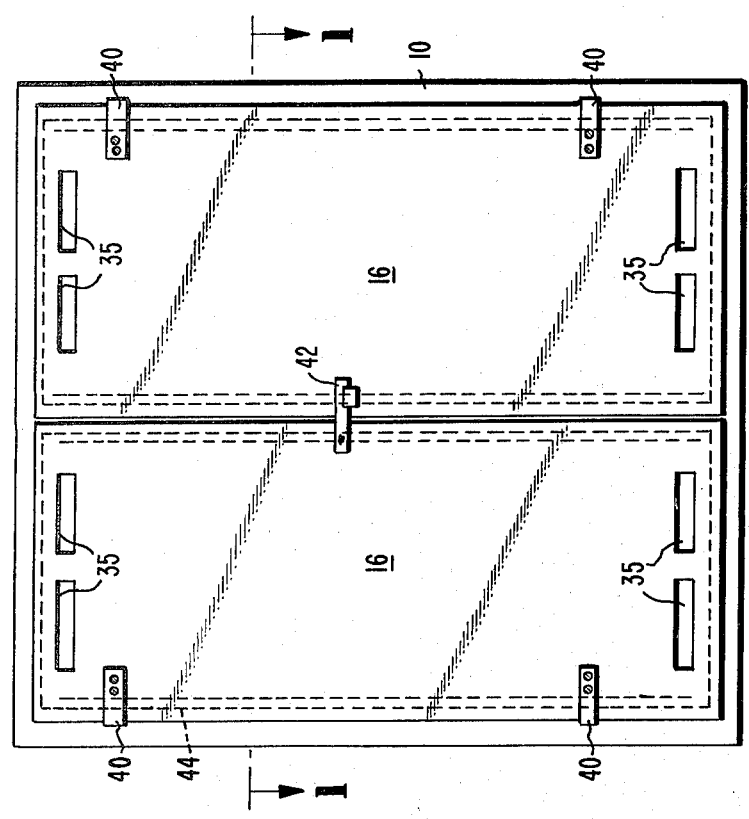
FIG. 2 is a face view of the heater unit of FIG. 1 as seen from inside the heated enclosure.

With reference to FIGS. 1 to 4 illustrating a preferred embodiment of this invention, the solar heating unit 15 is applied to a conventional window by attachment to the lower window sash casing 10 which generally is made of wood or metal, e.g. aluminum. Only windows having an orientation to receive solar radiation either directly or by reflection are suitably fitted with said solar heating units. The solar heating unit attached to the window sash has a boxlike configuration and is comprised of four relatively narrow rectangular side panels 12 approximately two inches wide, a front cover 14 consisting of a pane of untinted transparent glass, and two equal-sized back panels 16 which when closed cover the back of the box assembly.

Edges of the glass front cover 14 are covered by a flexible gasket 18 e.g. rubber, neoprene or foam, which protects and seals under pressure both the inner glass surface 20 and the outer glass surface 22 along the entire periphery of glass 14. Glass cover 14 is dimensioned to match window sash 10 so that when attached to sash 10 front glass cover 14 with flexible gasket 18 in place forms a complete seal against inner frame surface 11 of the sash 10. Said seal produces a dead air space 24 which acts as an insulator between the conventional glass window pane 26 and the front cover glass pane 14. A generally flat metal frame 28, on which rests the gasket 18, has holes 30 in its surface through which pass screws or bolts 32. Said screws or bolts 32 also pass through holes 19 in flexible gasket 18 and attach to window sash casing 10. By tightening action upon said fasteners 32 gasket 18 is compressed and air seals are created at surfaces 11, 20, 22. In another configuration, the surface of gasket frame 28 may be shaped as required to provide containment for flexible gasket material 18 should it tend to deform in compression.

In a preferred embodiment of this invention, box side panels 12 are wood with a plurality of slots 34 cut therethrough to allow free passage of air. The four side panels comprise a frame approximately 2 inches deep (or deeper if the window frame allows) attached by fasteners 36, i.e., threaded bolts, passing therethrough and engaging threaded holes 38 in metal gasket frame 28. The inside surfaces 13 of slotted side panels 12 are preferably highly heat absorbing, e.g. a dull black finish. In other configurations of this invention, the box sides may be fabricated of materials other than wood, such as plastics, so long as the material is of low conductivity; alternatively, the box sides are constructed with insulation to separate the exterior from hot interior surfaces. Rigid back panels 16 are attached to side panels 12 by vertically oriented hinges 40 which permit said back cover of the heater unit to swing out into the room (FIG. 4) to permit access for cleaning of interior surfaces and to allow viewing through the window. A simple latch device 42 holds back door panels 16 in a closed position when the heater operates. A plurality of slots 35 at the top and bottom of back panels 16 allows free circulation of air into and out of the box. The internal surface 17 of back panels 16 is highly heat absorbing, e.g. a dull black finish, but the panel 16 itself is made of low thermal conductivity material or is insulated so that the exterior of the box is not unsafely hot to touch.

Solar radiation entering the boxlike assembly through glass panes 14 and 26, impinges on two heating surfaces 44 which lie generally in a plane parallel to said glass panes 14 and 26 and back panels 16. Air passages 46 and 47 separate said heating surfaces 44 from facing glass 14 and back panel surfaces 17. The heating surfaces 44 are made of thin substantially flat sheet metal having a highly heat absorptive finish, e.g., dull black paint, applied thereon. This surface when exposed to solar radiation absorbs a large percentage of said solar energy and becomes elevated in temperature. The heat absorbed by the heated surfaces is subsequently transmitted to the ambient air as described below. In other embodiments of this invention, corrugated, fluted, finned and other surfaces in many differing arrangements may be employed by methods well known to those versed in this technology to increase the effective heat transfer area of the heating surfaces.

Figure 1:
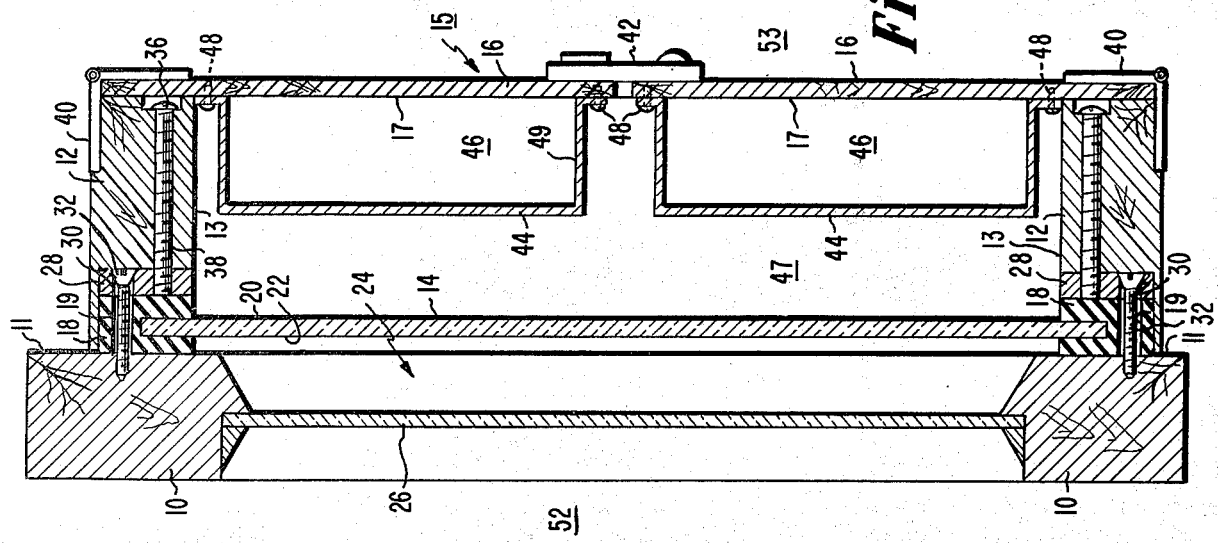
FIG. 1 is a top sectional view (not to scale) of a heater unit embodying this invention taken along the line 1—1 of FIG. 2.

The energy absorbing surfaces 44 are attached with screws 48 to back panels 16 by means of mounting flanges 49 formed from vertical folds in the heating surface metal (FIG. 1). In other embodiments of this invention many diverse means and points of attachment of the heating surface within the boxlike assembly are possible. Mounting flanges 49 need not be integral with heating surfaces 44. Utilization of two heating surfaces 44 and two back panels 16 in the preferred embodiment of this invention is not intended to limit the number of divisions of said surfaces and panels which may be utilized in other embodiments of this invention. In other embodiments of this invention flexible materials, e.g. cloth or parchment, suitably tensioned and positioned may be utilized as heating surface 44 and/or back panel 16, and low thermal conductivity material with highly absorptive surfaces may replace the thin metal used for heating surfaces 44 in the preferred embodiment.

In operation with the box assembly attached to the window sash 10, the sun's rays pass through the double glass panes 14 and 26 and impinge on the thermally absorptive surfaces 44 within the solar box, resulting in a substantial elevation in surface temperature. Air in the internal box passages 46 and 47 on both sides of the heated surfaces 44 becomes warmer because of contact or proximity with said heated surfaces 44 and rises passing out of the box assembly through the plurality of slots 34 and 35 provided in the top, side 12, and back panels 16. Cooler air from the enclosed space 53 which is to be heated, e.g. living quarters of a house, enters the box assembly through slots 34 and 35 in the bottom, side 12 and back panels 16 by natural convection and is in turn heated and rises. Reliance is made upon the aforesaid chimney effect produced by the heated vertical air passages 46 and 47 within the box assembly and no means of forced convection is required to induce the desired air flow and heat transfer.

When the sun fails to shine on the heat absorbing surfaces 44, or at any other time, the hinged back doors 16 with said heating surfaces 44 attached may be swung to the open position permitting light to directly enter the enclosure 53 and permitting unobstructed viewing through the window. Cleaning the box interior is also facilitated when the rear doors 16 are opened.

The double panes 14 and 26 with the dead air space 24 therebetween serve as a thermal insulator and are especially useful both when the sun's radiation is absent, and in the summer to reduce air conditioning requirements.

Heated surfaces 44 standing as they do between the warm room interior 53 and the colder external ambient atmosphere 52 reduce or reverse the natural flow of heat escaping from the room interior via the window. Thus, the large projected area of the heated surfaces 44, e.g. covering the entire lower sash 10 of a double sash window, is more effective in heating the enclosed space than a smaller projected surface area not only because it initially absorbs and distributes more heat from the sun but also because it reduces outflow of heat from the interior enclosed space 53.

The entire heater assembly is easily removable from the window for storage (if desired) in the summer; however, the front cover glass 14 held by gasket 18, frame 28 and screws 32 may remain on the window sash 10 at all times at the owner's option and serve as a thermal insulator.

Use of the heating unit 15 of this invention has the advantage of permitting the sun's thermal energy to enter a space 53 to be heated without entry of the sun's rays which can cause damage to carpets, furniture, draperies, etc. Pumps, blowers, circulating liquid, secondary heat exchangers and heat storage are not required. By its attachment to the inside of the window sash 10 the heating unit 15 suffers no adverse effects from wind, rain, snow, etc., and is readily cleaned and maintained from within the heated space 53. No modification, interior or exterior, need be made to a conventional window sash 10 in order to attach the heating unit 15 and the vertically slideable window sash 10 may be raised or lowered with said heating unit 15 attached.

Various other modifications of this invention may be made and will be apparent from the foregoing description. The foregoing description of a preferred embodiment is presented by way of illustration and not as a limitation on the scope of this invention. For example, the illustrated embodiment of the invention is shown applied to vertically slideable window sash; but this invention is not so limited in its application and may be used on any sash, fixed or movable, window or door.

What is claimed is:

1. A solar heater for attachment to the inside of windows of buildings comprising:

a box assembly having a rear panel member including heat exchanger means and top, bottom and spaced side panels forming a box enclosure with said rear panel and having air passages in at least one of said panels; and means for removably attaching said box enclosure to a window sash to enclose the sash and with said rear panel spaced from and projecting inside the associated building from the window of the associated sash;

said heat exchanger means including a member of high thermal conductivity and having a surface of high heat absorptivity and being attached to said rear panel and spaced therefrom and from the sash for receiving solar radiation passing through the associated sash window and for heating air enclosed within said box assembly and passing on both sides thereof;

said air passages being located at the top and bottom of said box assembly for passing air from inside the associated building through the bottom passage upwards on both sides of said heat exchanger and with convection heating thereof back into the associated building through the top passage.

2. A solar heater as recited in claim 1 wherein said surface of high heat absorptivity is substantially equal in projected area to the area of said enclosed sash window.

3. A solar heater as recited in claim 1 wherein said side and back panels are slotted to pass said air.

4. A solar heater as recited in claim 1 wherein said back panel and said heat absorbing surface are divided in sections and hinged permitting opening of said box enclosure from within the building so as to give access to the interior of said box enclosure and to expose window surfaces to view.

5. A solar heater as recited in claim 1 wherein said panels of said box enclosure consist of opaque material having low thermal conductivity.

6. A solar heater as recited in claim 5 wherein said back panel of said box enclosure has an interior surface of high heat absorptivity.

7. A solar heater as recited in claim 1, wherein said box enclosure further includes a transparent window spaced from said rear panel to pass radiation from said sash window to said heat exchanger and assembled to be spaced and sealed from said sash window when the box assembly is attached to said sash.

* * * * *